(12) United States Patent
Diskin et al.

(10) Patent No.: US 9,043,745 B1
(45) Date of Patent: May 26, 2015

(54) SYSTEMS AND METHODS FOR MONITORING PRODUCT DEVELOPMENT

(71) Applicant: FMR LLC, Boston, MA (US)

(72) Inventors: Alan Diskin, Galway (IE); Gerard McMahon, Galway (IE); Stephen Ashmore, Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/322,378

(22) Filed: Jul. 2, 2014

(51) Int. Cl.
*G06F 9/44* (2006.01)

(52) U.S. Cl.
CPC ........................................ *G06F 8/70* (2013.01)

(58) Field of Classification Search
USPC .......................................................... 717/102
See application file for complete search history.

(56) References Cited

U.S. PATENT DOCUMENTS

| | | | |
|---|---|---|---|
| 8,601,441 B2 | 12/2013 | Kaulgud et al. | |
| 2007/0168918 A1* | 7/2007 | Metherall et al. | 717/101 |
| 2010/0021870 A1* | 1/2010 | Patten et al. | 434/118 |
| 2013/0339933 A1* | 12/2013 | Walters | 717/131 |
| 2014/0053127 A1* | 2/2014 | Madison et al. | 717/103 |
| 2014/0115557 A1* | 4/2014 | Holler et al. | 717/102 |
| 2014/0223409 A1* | 8/2014 | Holler et al. | 717/101 |

FOREIGN PATENT DOCUMENTS

WO       2005011243 A1    2/2005

* cited by examiner

*Primary Examiner* — John Chavis
(74) *Attorney, Agent, or Firm* — Proskauer Rose LLP

(57) ABSTRACT

A computer-implemented method is provided for evaluating team performance in a product development environment. The method includes receiving a plurality of points of effort made by a team over a plurality of days in a time period, computing a slope associated with a line of best fit through the plurality of points of effort over the plurality of days, computing a deviation of the slope from an ideal slope corresponding to a desired performance rate for the team, and generating a display illustrating at least one of the slope, the ideal slope or the deviation.

13 Claims, 4 Drawing Sheets

SYSTEMS AND METHODS FOR MONITORING PRODUCT DEVELOPMENT

FIELD OF THE INVENTION

The invention generally relates to computer-implemented methods and apparatuses, including computer program products, for evaluating team performance in a product development environment.

BACKGROUND

Product development management involves, in part, planning, organizing, securing and managing resources to bring about the successful completion of a project with respect to specific goals and objectives. Project managers can manage resources using, for example, agile development approaches, which are characterized by factors such as relatively short time-frame intervals (often referred to as sprints or iterations), delivery of certain goals at the end of each iteration, and regular adaptation of requirements and designs in response to changing circumstances. Exemplary changes in circumstances include changes in business goals, changes driven by customer feedbacks, changes driven by improved understanding of technological challenges, changes to downstream features based on cumulative knowledge, changes in skills and resources, and changes derived from improved knowledge of estimates of work completion based on team velocity.

Under agile development approaches, a project can be organized into one or more features with each feature delivering a package of related functionalities that an end user generally expects to get all at once. In turn, each feature can be broken down into a collection of related stories with each story defining a particular functionality. For example, given a feature involving programming inline table resizing, it can be broken down into three stories—resizing columns, resizing rows and resizing the table itself. In addition, a working feature or product can be produced at the end of a release, during which the feature or product is refined through successive iterations. Typically, each iteration involves a team working through a full development cycle including the phases planning, designing and testing. Thus, agile methods minimize overall risks by allowing a project to adapt to changes quickly.

One common challenge for product development management teams using any product development approach (e.g., an agile approach) is trying to measure and compare progress made by different teams, especially when the teams are composed of different types of members and/or work on different products. Meaningful insights gathered regarding how project teams achieve results can be critical to the success of current projects as well as future projects. Typically, in an agile development approach, story points, burndown and velocity metrics can be used to measure team effectiveness. Story points refer to units of effort and can be used by a team to estimate and track work. Burndown refers to story points completed and plotted against time lapsed. The burndown has only been used by teams within and during a short time period, such as a given iteration, to visually track progress during that period. Velocity refers to the average number of story points delivered by an agile team over one or more iterations, which is important for forecasting how much work a team is able to handle. However, none of these metrics can accurately, fairly and consistently quantify team effectiveness to enable analysis of cross-team behavior (e.g., behavior of different teams staffed on different projects) to inform decision-making at the organizational level. In particular, story points and velocity (i.e., a function of story points) are specific to a given team. They represent a blend of inherent team understanding, assumptions and norms that are team specific. Hence, these metrics are inherently inefficient and inaccurate for comparing cross-team effectiveness.

SUMMARY OF THE INVENTION

Methods and apparatuses are provided to detect and/or signal behavior patterns associated with at least one team during or after the execution of a project. In some embodiments, a scoring algorithm is provided that can evaluate team efficiency based on historical, real-time, and/or near real-time data. In the context of this technology, a team can include a single employee or multiple employees staffed on at least one project. A project can be an agile project defined under an agile development method or under any other development management approach. Even though methods and apparatuses of the present technology are described in the context of the agile project management environment, these methods and apparatuses are equally applicable to other project management environments.

Methods and apparatuses of the present technology allow teams to meet deadlines, including both incremental (e.g., iteration) deadlines and final product delivery (e.g., release) deadlines, even when in-flight changes occurs, such as changes in customer priorities and demands. These methods and apparatuses can measure and track ongoing team performance with consistency and predictability.

In one aspect, a computer-implemented method is provided for evaluating team performance in a product development environment. The method includes receiving, by a computing device, a plurality of points of effort made by a team over a plurality of days in a time period. Each points of effort corresponds to a day within the time period on which the effort is made with respect to the completion of at least one functionality. The method includes determining, by the computing device, a line of best fit through the plurality of points of effort over the plurality of days in the time period and computing, by the computing device, a slope associated with the line of best fit. The method also includes computing, by the computing device, a deviation of the slope from an ideal slope corresponding to a desired performance rate for the team. The deviation provides a quantitative measure of the performance of the team over the plurality of days, such as a positive deviation indicates over delivery by the team and a negative deviation indicates under delivery by the team. The method further includes generating, by the computing device, a display illustrating at least one of the slope, the ideal slope or the deviation.

In another aspect, a computer-implemented system, used in a product development environment, is provided for evaluating team performance. The system includes an input module configured to receive a plurality of points of effort made by a team over a plurality of days in a time period. Each points of effort corresponds to a day in the plurality of days on which the effort is made with respect to the completion of at least one functionality. In addition, the system includes a calculation module configured to determine a line of best fit through the plurality of points of effort over the plurality of days in the time period and compute a slope associated with the line of best fit. The calculation module is further configured to compute a deviation of the slope from an ideal slope corresponding to a desired performance rate for the team. The deviation provides a quantitative measure of the performance of the team over the plurality of days, such as a positive deviation indicates over delivery by the team and a negative deviation indicates under delivery by the team. The system further includes a display module configured to illustrate at least one of the slope, the ideal slope or the deviation.

In yet another aspect, a computer program product, tangibly embodied in a non-transitory machine-readable storage device, is provided for evaluating team performance in a product development environment. The computer program product includes instructions being operable to cause data processing apparatus to receive a plurality of points of effort made by a team over a plurality of days in a time period. Each points of effort corresponds to a day in the plurality of days on which the effort is made with respect to the completion of at least one functionality. The computer program product includes instructions being operable to cause data processing apparatus to determine a line of best fit through the plurality of points of effort over the plurality of days and compute a slope associated with the line of best fit. The computer program product also includes instructions being operable to cause data processing apparatus to compute a deviation of the slope from an ideal slope corresponding to a desired performance rate for the team. The deviation provides a quantitative measure of the performance of the team over the plurality of days, such as a positive deviation indicates over delivery by the team and a negative deviation indicates under delivery by the team. Furthermore, the computer program product includes instructions being operable to cause data processing apparatus to display at least one of the slope, the ideal slope or the deviation.

In other examples, any of the aspects above can include one or more of the following features. In some embodiments, a second plurality of points of effort made by a second team over a second plurality of days in a second time period is received. Subsequently, a second slope is calculated in association with the second plurality of points of effort over the second plurality of days in the second time period. The slope for the team and second slope for the second team are compared to quantitatively evaluate the performance of the team against the second team. The team can be staffed on a different project than the second team. The time period and the second time periods can be the same time period or different time periods. A duration of the time period can be about the same as a duration of the second time period. In some embodiments, the time period comprises at least a part of a release in the agile environment.

In some embodiments, a second slope can be calculated corresponding to the performance of the team during a second time period different from the time period. The slope and the second slope can be compared to track the performance of the team over time.

In some embodiments, a plurality of deviations over a plurality of time periods are aggregated to discern a performance pattern for the team. A performance risk can be signaled if the deviations meet a predetermined threshold for a predetermined number of time periods. A probability of the team completing a task in an expected time period can be computed based on the performance risk, where the time period is less than the expected period of completion.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION OF THE INVENTION

In some embodiments of the present technology, graphs of actual story points completed over at least one time period are compared with an ideal graph, and linear mathematical analysis with respect to these graphs can be used to determine team effectiveness for that time period, thereby providing a consistent, quantitative basis for comparison with other teams. In some embodiments, the analysis of the slope of a line that represents story points completion by an agile team and the degree of its deviation from an ideal line helps a project manager to uncover evidence of dysfunction in the agile team. Team effectiveness in this instance can be proportional to the proximity of the actual line from the ideal line over a finite duration, such as over a given iteration or release of the agile project. In some embodiments, team effectiveness is quantified by a score that is determined based on the magnitude and direction of the deviation.

Figure 1:
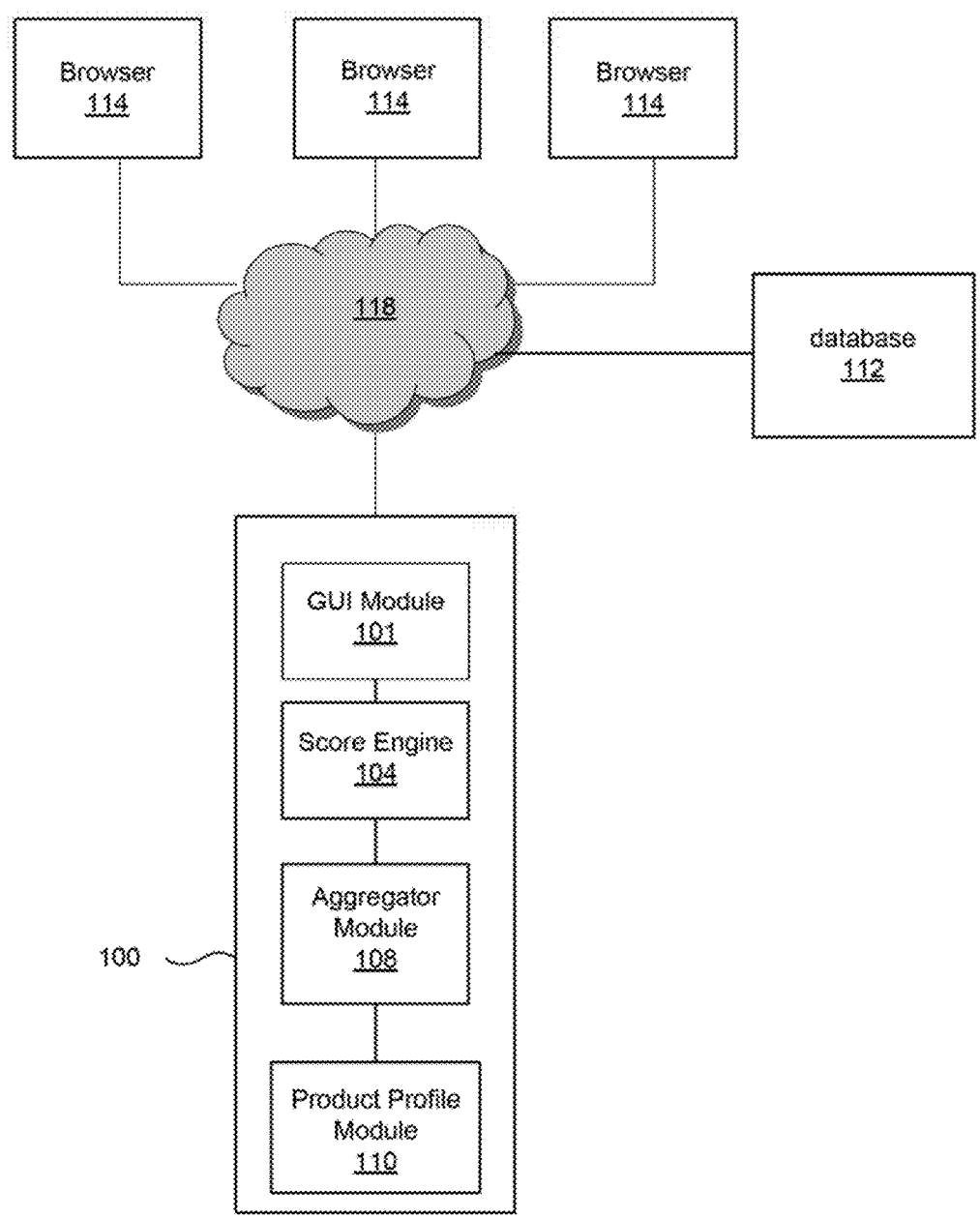
FIG. 1 shows an exemplary evaluation system for calculating team effectiveness within an illustrative network environment.

FIG. 1 shows an exemplary computer-based evaluation system for calculating team effectiveness within an illustrative network environment. The network environment includes multiple user devices 114 configured to communicate with the evaluation system 100 via an IP network 118. The evaluation system 100 can in turn communicate with at least one database 112 for retrieving and storing pertinent data. The evaluation system 100 includes a combination of hardware modules. As shown, the evaluation system 100 includes a graphical user interface (GUI) module 101, a score engine 104, an aggregator module 108 and a product profile module 110. In general, the evaluation system 100 can be executed on one or more hardware devices to implement the exemplary process of FIG. 2.

The product profile module 110 is adapted to receive performance data supplied by a user related to one or more projects. For example, for a particular project assigned to a team, a user can specify, during the execution of the project, the effort (e.g., in points) made by the team over one or more recent time intervals with respect to the completion of one or more functionalities, such as on a daily, weekly or iteration basis. In addition, the user can supply to the product profile module 110 information about the project itself, such as information about the product being developed, the duration of the release planned, the duration of each iteration of the release, and/or the identity and role of each member of the team.

The score engine 104 is adapted to compute a score that quantitatively measures the performance/effectiveness of a team in relation to a particular project over a given time period. The score engine 104 can compute the score based on the project performance data supplied by the user via the product profile module 110. The score engine 104 can periodically update the score calculation based on the latest project data, thereby constantly monitoring the effectiveness of the team as the project progresses. For example, the score engine 104 can compute a score after the team completes every iteration in the product development cycle. In some embodiments, the score engine 104 computes the scores using linear mathematical algorithms.

The aggregator module 108 is configured to aggregate previous scores for an ongoing project to discern any on-going behavior patterns (e.g., consistent over delivery or under delivery by the team). In some embodiments, the aggregator module 108 can trigger an alert signal if certain alert conditions are detected. For example, the aggregator module 108 can compute the probability of a project being successfully completed by a planned date and trigger an alert if the probability is lower than a predefined threshold.

The GUI module 101 is configured to display to a user the scores generated by the score engine 104 and/or any alerts triggered by the aggregator module 108. For example, the GUI module 101 can display a dashboard interface that shows score updates along with any alert-based updates. The display enables a user to visualize behavior patterns, recognize performance issues, and determine remedial actions to take in response, all during the execution of the project, thereby ensuring that the project can be completed by the planned release or iteration deadline. In addition, the GUI module 101 can handle user access (e.g., login and/or logout), user administration (e.g., any of the administration functions associated with the support and/or management of the system 100), widget management (e.g., providing the end user with the capability to arrange and save preferences for display of data within the browser area), and/or other GUI services.

The database 112 is configured to store various types of data related to one or more ongoing projects as well as completed projects. For example, the database 112 can store, for each project, scores corresponding to multiple time periods during the project development cycle, alerts previously triggered, and project characteristics (e.g., whether the project was completed in time if the project is a historical project, characteristics of the team members, product involved, etc.). In general, any data received or generated by the score engine 104, the aggregator module 108 and/or the product profile module 110 can be stored in the database 112.

Figure 2:
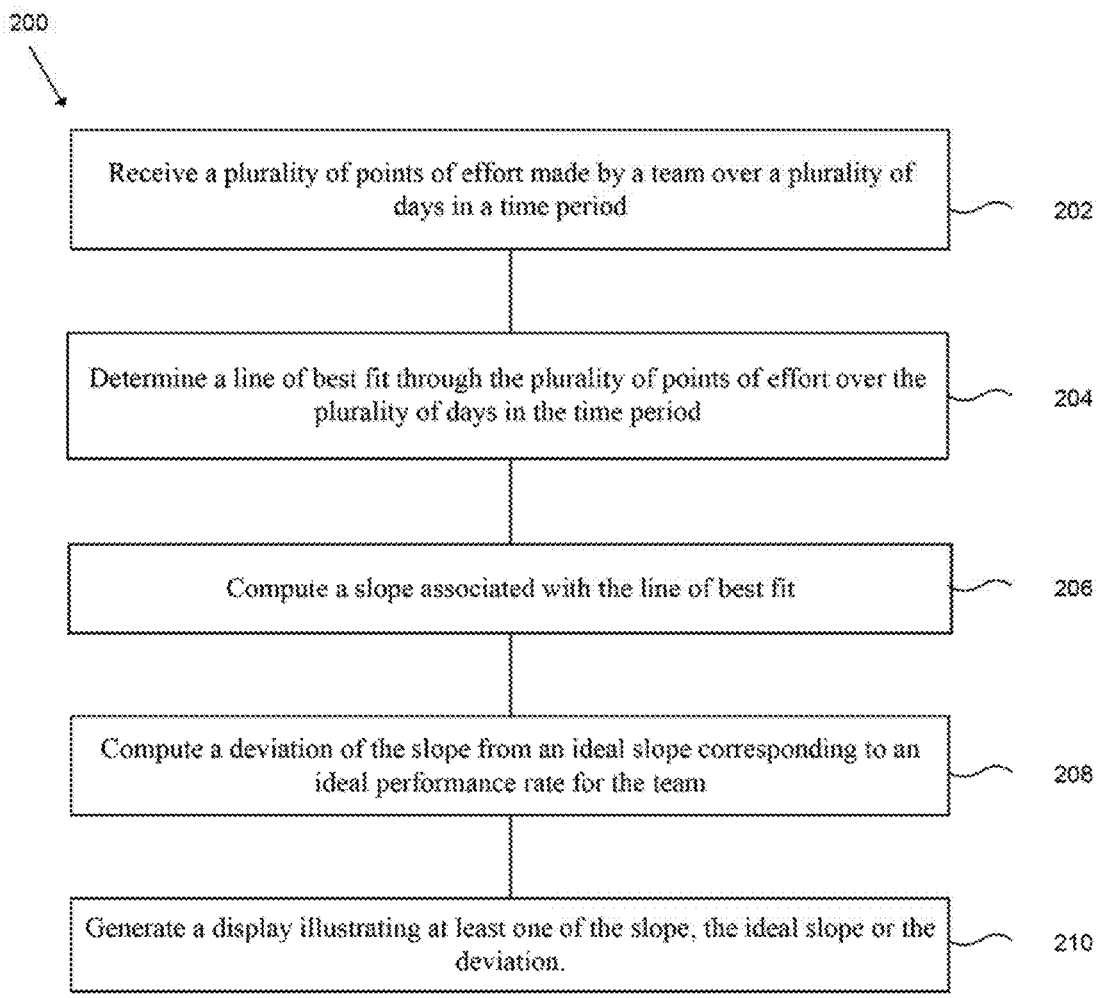
FIG. 2 shows an exemplary process for evaluating team effectiveness.

FIG. 2 shows an exemplary evaluation process for quantifying the effectiveness of a team. The evaluation process 200 can be implemented by the evaluation system 100 of FIG. 1. The evaluation system 100 can receive on a periodic basis data that represent efforts, in the unit of points, made by a team over one or more days in a specific time period with respect to the completion of one or more functionalities of a project (step 202). In some embodiments, the team can provide to the evaluation system 100 the points of effort made on each day of a given time period for a project. In some embodiments, the team can provide to the evaluation system 100 the aggregate number of effort points made thus far in the time period. The data can be provided to the evaluation system 100 via the product profile module 110. In general, points of effort represent a measure of a team's effort to deliver one or more functionalities. In some embodiments, points of effort provide a relative measure and are specific to a given team. Hence effort in points for one team may not be comparable to effort in points associated with a different team. For example, implementing a functionality that involves selection of a stock by ticker or cusip and drill down into the characteristics of the stock corresponds to 5 points of effort while implementing a functionality that involves selection of a portfolio and discover the current and historical performance over a selected range of time corresponds to 20 points of effort. Hence, the more sophisticated the functionality, the higher the points of effort point. In addition, for completing the same functionality, one team's points of effort may be different than another team's.

Based on the data received, the evaluation system 100 can proceed to determine a line of best fit through the set of points of effort over the multiple days in the time period (step 204). The evaluation system 100 can accomplish this by generating a plot with the x-axis indicating the time period (e.g., in the unit of days) and the y-axis indicating effort in points. Therefore, a plot can include a line of best fit (herein referred to as the "actual line") through multiple data points, where each data point represents an effort point corresponding to a given day in the time period. The plot can also include an ideal line representing the desired work progress and completion goals for the team with respect to the particular project for the given duration. For example, the ideal line can specify how much effort in points need to be made on each day of the given duration. This ideal line can be specified by the team via the product profile module 110. Hence, the ideal line represents the optimal progression of story points completed by a team over a period of time to ensure, for example, linear completion and a sustainable pace.

The evaluation system 100 then proceeds to compute a slope (step 206) associated with the actual line generated at step 204. The slope (herein referred to as the "actual slope") represents an estimated rate of work actually completed by the team in the given time period. In some embodiments, the evaluation system 100 also computes a slope associated with the ideal line (herein referred to as the "ideal slope") and determines a deviation of the actual slope from the ideal slope. The deviation can be calculated as $S_r = m_i - m_a$, where $S_r$ represents the deviation for the $r^{th}$ time period, $m_i$ represents the ideal slope for that time period, and $m_a$ represents the corresponding actual slope for the $r^{th}$ time period. Hence, the deviation (herein referred to as a "score") can be used as a score to quantitatively measure the performance/effectiveness of the team over the given time period. In some embodiments, both the magnitude and direction of the score are important to determine the effectiveness of a team, where a positive score indicates over delivery by the team, a negative score indicates under delivery by the team and the magnitude of a score reflects the amount of over or under delivery. In general, the deviation of the slope of an actual line from that of an ideal line provides a more robust metric for evaluating cross-team performance, especially considering that the lines themselves only capture efforts in points, which serve as team-specific metrics. In contrast, the deviation associated with one team can be compared with the deviation associated with another team to provide accurate analysis of cross-team behavior. In some embodiments, the score engine 104 of the evaluation system 100 is configured to execute the steps 204, 206 and 208 of the process 200 by determining the actual and ideal lines, the actual and ideal slopes and the score for a given time period.

Figure 3:
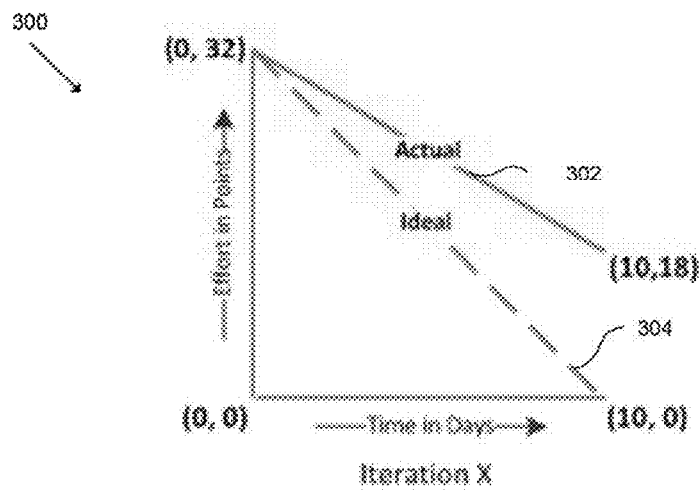
FIG. 3 shows an exemplary plot for determining at least one score for a team.

FIG. 3 shows an exemplary plot 300 that includes both an actual line 302 and an ideal line 304 for a given agile iteration that spans a time period of 10 days. As shown, at the end of the iteration (i.e., day 10), the team has only made 14 points of effort, but the ideal is to have made 32 points of effort by day 10. Mathematically, the actual line 302 has a slope of −1.4, the ideal line 304 has a slope of −3.2, and the score is −1.8, which indicates under delivery by the team.

The process of FIG. 2 can be used to monitor the effectiveness of a team during the execution of an in-flight project or after the project is completed. For example, to discern an ongoing trend in project performance, the evaluation system 100 can aggregate the scores determined over a number of time periods as $\Sigma_{r=1}^{n} S_r$, where each score corresponds to a deviation between the actual and ideal slopes for a time period. If the aggregated score is negative, it may indicate consistent under delivery. Similarly, if the aggregated score is positive, it may indicate consistent over delivery, which may not be desirable because the team may experience burn out if it works at a potentially unsustainable pace for extended periods of time. In addition, over delivery can indicate an array of issues including the team using sub-optimal means to achieve the over delivery schedule and/or the team is poor at estimating performance, which impedes planning by making it more difficult for a program manager to forecast resource needs and deadlines.

In some embodiments, the evaluation system 100 can track the number of previous instances where the magnitude of the scores exceed a predefined threshold for an ongoing project and the percentage of time remaining in a release or iteration for the same project. Given the percentage of time remaining and the scores, the evaluation system 100 can determine, based historical score data, the probability that the project can be completed by the planned release or iteration date. The historical score data can be gathered from projects that have the similar score patterns as the current project (e.g., similar aggregated scores) and have similar characteristics as the current project (e.g., having similar products being developed, overlapping team members, and similar team size and/or roles). The probability of completion can be determined by calculating the percentage of these projects that successfully delivered the products by the planned release or iteration dates. In some embodiments, the aggregator module 108 of the evaluation system 100 is configured to calculate the aggregated score and the probability of on-time delivery for one or more in-flight projects.

Figure 4:
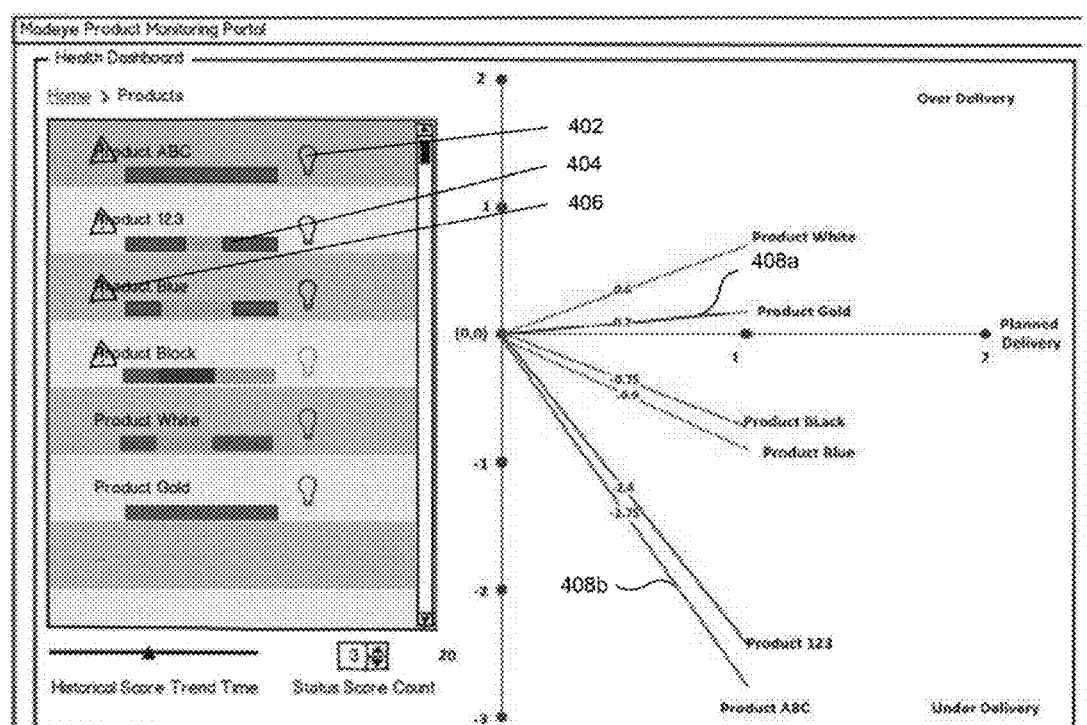
FIG. 4 shows an exemplary user interface generated by the evaluation system.

FIG. 4 shows an exemplary dashboard interface that can be generated by the evaluation system 100 to visually track the status of multiple in-flight projects. Specifically, the GUI module 101 of the evaluation system 100 can be configured to present the dashboard interface 400 of FIG. 4. As shown, the interface 400 tracks the status of six ongoing projects, with each project being associated with a current score alert 402, a historical score reference 404, a product alert 406, and a trend line 408. The historical score alert 404 indicates the overall health of a project, which is determined based on an aggregate (e.g., sum) of historical scores of the project over time. An indicator, such as a color-coded light bulb, can be used to visually illustrate the overall health. For example, green means good health, orange means failing health, and red means bad health. The current score reference 404 indicates the health status of a project during the current time period. A color-coded light bulb can also be used to visually indicate the current health status of the project. The product alert 406 can appear if the predicted probability that the project cannot be completed on time exceeds a certain threshold. The trend line 408 plots the calculated scores for the project as a function of time. For example, for the "product gold" project, the estimated score for the first iteration is +0.2, as illustrated by the trend line 408a, which indicates slight over delivery. In contrast, for the "product ABC" project, the estimated score for the first iteration is −2.75, as illustrated by the trend line 408b, which indicates gross under delivery. The present technology thus allows a project manager to quantitatively compare the effectiveness of different teams, even when the teams are involved in the development of different products and/or have different team characteristics. In some embodiments, the performance comparison between teams can be based on work done in different time periods, such as the score in iteration 1 for the "product white" team and the score in iteration 2 for the "product ABC" team. In some embodiments, the performance comparison between different teams can be based on work done in the same time period, such as the score in iteration 1 for the "product white" team and the score in iteration 1 for the "product ABC" team. In some embodiments, the project manager can monitor the progress made by a single team over time by comparing the scores for that team over different time periods, such as the scores in iteration 1 and iteration 2 for the "product white" team.

Based on the data displayed in the interface 400, a project manager can take remedial actions (e.g., in response to an alert) to ensure that a project is on track for completion by a projected deadline. For example, if there is consistent under delivery, the project manager can identify gaps in resources and generate one or more action plans, such as plans for additional hiring, outsourcing, or training. The project manager can also monitor the effectiveness of the remedial actions by determining whether the scores in the subsequent agile iterations have improved. In some embodiments, if there are in-flight changes, such as a sudden increase in the number of functionalities to be delivered in the subsequent iterations, the project manager can adjust data associated with the ideal line to reflect the changing goals, which allows the project manager to quantitatively determine how much current team effort needs to be adjusted to meeting the changing demands.

Figure 5:
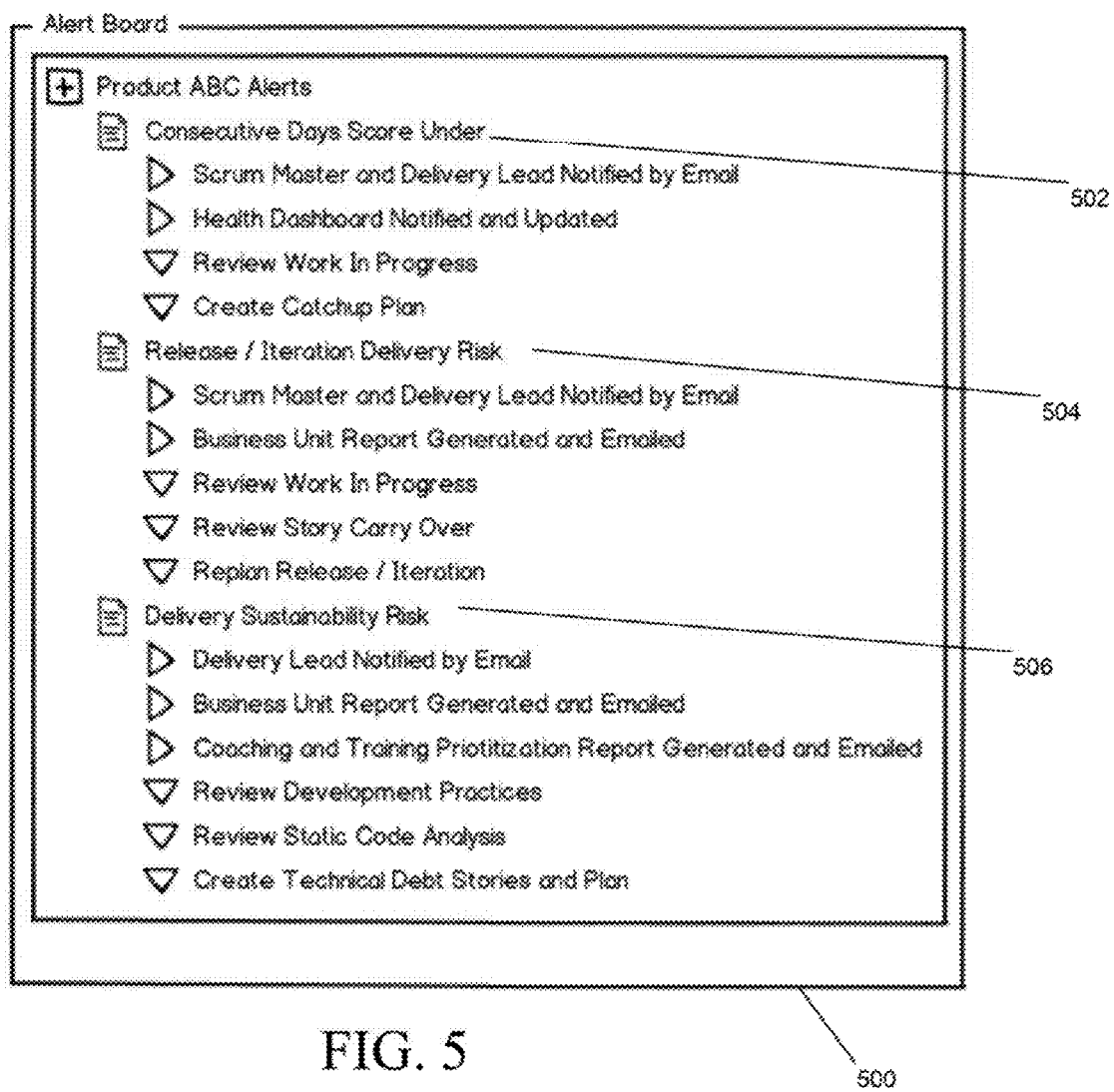
FIG. 5 shows an exemplary alert board generated by the evaluation system.

FIG. 5 shows an exemplary alert board 500 generated by the evaluation system 100 to visualize one or more alerts. Specifically, the GUI module 101 of the evaluation system 100 can be configured to present the alert board 500 of FIG. 5. The evaluation system 100 can automatically review generated scores (e.g., newly generated scores illustrated by the current score alert 404 and historical scores illustrated by the historical score alert 404) and apply configured rules to execute notifications and recommend remedial actions for the alerts. Exemplary alerts include (i) a Consecutive Days Score Under alert 502 to alert a user if scores for a project has been consistently lower than a predefined threshold for a period of time; (ii) Release/Delivery at Risk alert 504 to alert a user to a risk of an ongoing project not meeting a planned deadline; and (iii) Delivery Sustainability Risk alert 506 to alert a user to a risk of over delivery that can lead to possible unstainable work pace. For each alert, the alert board 500 can also recommend one or more remedial actions including creating a catch-plan for a Consecutive Days Score Under alert 502, postpone a deadline in response to a Release/Delivery at Risk alert 504, or review development practices for a Delivery Sustainability Risk alert 506.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for evaluating team performance in a product development environment, the method comprising:
receiving, by a computing device, (i) a plurality of points of effort completed by a team over a plurality of days in a time period, wherein each points of effort corresponds to a day within the time period on which the effort is made with respect to the completion of at least one functionality, and (ii) a second plurality of points of effort made by a second team over a second plurality of days in a second time period;
calculating, by the computing device, a slope corresponding to the team, comprising:
(a) determining, by the computing device, a line of best fit through the plurality of points of effort over the plurality of days in the time period; and
(b) computing, by the computing device, the slope associated with the line of best fit;
repeating steps (a) and (b), by the computing device, to calculate a second slope associated with the second plurality of points of effort over the second plurality of days in the second time period corresponding to the second team;
computing, by the computing device, at least one of (i) a deviation of the slope from an ideal slope corresponding to a desired performance rate for the team or (ii) a second deviation of the second slope from a second ideal slope corresponding to a desire performance rate for the second team, the deviation or the second deviation providing a quantitative measure of the performance of the corresponding team over the corresponding plurality of days, wherein a positive deviation indicates over delivery by the corresponding team and a negative deviation indicates under delivery by the corresponding team;

comparing, by the computing device, the slope and the second slope to quantitatively evaluate the performance of the team against the second team; and generating, by the computing device, a display illustrating at least one of the deviation, the second deviation or the comparison between the slope and the second slope.

2. The computer-implemented method of claim 1, wherein the team is staffed on a different project than the second team.

3. The computer-implemented method of claim 1, wherein the time period and the second time periods are the same time period.

4. The computer-implemented method of claim 1, wherein the time period and the second time period are different time periods.

5. The computer-implemented method of claim 1, wherein a duration of the time period is about the same as a duration of the second time period.

6. The computer-implemented method of claim 1, wherein the time period comprises at least a part of a release in the agile environment.

7. The computer-implemented method of claim 1, further comprising:
computing, by the computing device, a third slope corresponding to the performance of the team during a third time period different from the time period; and
comparing, by the computing device, the slope and the third slope to track the performance of the team over time.

8. The computer-implemented method of claim 1, further comprising aggregating, by the computing device, a plurality of deviations over a plurality of time periods to discern a performance pattern for the team.

9. The computer-implemented method of claim 8, further comprising signaling a performance risk if the deviations meet a predetermined threshold for a predetermined number of time periods.

10. The computer-implemented method of claim 9, further comprising calculating a probability of the team completing a task in an expected time period based on the performance risk, wherein the time period is less than the expected period of completion.

11. A computer system, used in a product development environment, for evaluating team performance, the system comprising:
a memory comprising:
an input module configured to receive (i) a plurality of points of effort made by a team over a plurality of days in a time period, wherein each points of effort corresponds to a day in the plurality of days on which the effort is made with respect to the completion of at least one functionality, and (ii) a second plurality of points of effort made by a second team over a second plurality of days in a second time period;
a calculation module configured to:
calculate a slope corresponding to the team, comprising
a. determine a line of best fit through the plurality of points of effort over the plurality of days in the time period; and
b. compute the slope associated with the line of best fit;
repeat steps (a) and (b) to calculate a second slope associated with the second plurality of points of effort over the second plurality of days in the second time period corresponding to the second team;
compute at least one of (i) a deviation of the slope from an ideal slope corresponding to a desired performance rate for the team or (ii) a second deviation of the second slope from a second ideal slope corresponding to a desire performance rate for the second team, the deviation or the second deviation providing a quantitative measure of the performance of the corresponding team over the corresponding plurality of days, wherein a positive deviation indicates over delivery by the corresponding team and a negative deviation indicates under delivery by the corresponding team;
compare the slope and the second slope to quantitatively evaluate the performance of the team against the second team; and
a display module configured to illustrate at least one of the deviation, the second deviation or the comparison between the slope and the second slope; and
a processor capable of executing the input module, the calculation module, and the display module.

12. The computer system of claim 11, wherein the calculation module is further configured to:
compute a third slope corresponding to the performance of the team during a third time period different from the time period; and
compare the slope and the third slope to track the performance of the team over time.

13. A computer program product, tangibly embodied in a non-transitory machine-readable storage device, for evaluating team performance in a product development environment, the computer program product including instructions being operable to cause data processing apparatus to:
receive (i) a plurality of points of effort made by a team over a plurality of days in a time period, wherein each points of effort corresponds to a day in the plurality of days on which effort is made with respect to the completion of at least one functionality, and (ii) a second plurality of points of effort made by a second team over a second plurality of days in a second time period;
calculate a slope corresponding to the team, comprising
(a) determine a line of best fit through the plurality of points of effort over the plurality of days; and
(b) compute the slope associated with the line of best fit;
repeat steps (a) and (b) to calculate a second slope associated with the second plurality of points of effort over the second plurality of days in the second time period corresponding to the second team;
compute at least one of (i) a deviation of the slope from an ideal slope corresponding to a desired performance rate for the team or (ii) a second deviation of the second slope from a second ideal slope corresponding to a desire performance rate for the second team, the deviation or the second deviation providing a quantitative measure of the performance of the corresponding team over the corresponding plurality of days, wherein a positive deviation indicates over delivery by the corresponding team and a negative deviation indicates under delivery by the corresponding team;
compare the slope and the second slope to quantitatively evaluate the performance of the team against the second team; and
display at least one of the deviation, the second deviation or the comparison between the slope and the second slope.

* * * * *

UNITED STATES PATENT AND TRADEMARK OFFICE
CERTIFICATE OF CORRECTION

| | | |
|---|---|---|
| PATENT NO. | : 9,043,745 B1 | Page 1 of 1 |
| APPLICATION NO. | : 14/322378 | |
| DATED | : May 26, 2015 | |
| INVENTOR(S) | : Alan Diskin et al. | |

It is certified that error appears in the above-identified patent and that said Letters Patent is hereby corrected as shown below:

In the claims,

Column 11, claim 11, line 47, delete the ":" after the word "comprising"

Column 12, claim 11, line 14, delete the word "and" after "team;"

Signed and Sealed this
Twenty-second Day of December, 2015

Michelle K. Lee
*Director of the United States Patent and Trademark Office*